United States Patent [19]
Elie et al.

[11] Patent Number: 5,814,999
[45] Date of Patent: Sep. 29, 1998

[54] METHOD AND APPARATUS FOR MEASURING DISPLACEMENT AND FORCE

[75] Inventors: Larry Dean Elie, Ypsilanti; John Matthew Ginder, Plymouth; Joseph Steven Mark, Dearborn; Mark Edward Nichols, Saline, all of Mich.

[73] Assignee: Ford Global Technologies, Inc., Dearborn, Mich.

[21] Appl. No.: 863,765

[22] Filed: May 27, 1997

[51] Int. Cl.⁶ ............................. G01R 27/26; G01R 27/08
[52] U.S. Cl. ............................................. 324/662; 324/699
[58] Field of Search ............................... 324/207.13, 209, 324/226, 658, 661, 662, 663, 671, 683, 691, 699; 33/783, 787; 73/779, 780

[56] References Cited

U.S. PATENT DOCUMENTS

| | | |
|---|---|---|
| 4,558,077 | 12/1985 | Gray . |
| 4,869,476 | 9/1989 | Shtarkman . |
| 5,051,200 | 9/1991 | Srail et al. . |
| 5,173,206 | 12/1992 | Dickens, Jr. et al. . |
| 5,276,623 | 1/1994 | Wolfe . |
| 5,277,281 | 1/1994 | Carlson et al. . |
| 5,337,865 | 8/1994 | Kasahara et al. . |
| 5,354,488 | 10/1994 | Shtarkman et al. . |
| 5,366,211 | 11/1994 | Hamada et al. . |
| 5,382,373 | 1/1995 | Carlson et al. . |
| 5,390,121 | 2/1995 | Wolfe . |
| 5,396,973 | 3/1995 | Schwemmer et al. . |
| 5,492,312 | 2/1996 | Carlson . |
| 5,547,049 | 8/1996 | Weiss et al. . |

FOREIGN PATENT DOCUMENTS

| | | |
|---|---|---|
| 0-298-266-A2 | 1/1989 | European Pat. Off. . |
| 2-579-283-A1 | 9/1986 | France . |
| 39-12-058-A1 | 4/1989 | Germany . |
| 2-003-722 | 9/1990 | Japan . |
| 3-249-440 | 7/1991 | Japan . |
| 4-107334 | 4/1992 | Japan . |
| 4-197811 | 7/1992 | Japan . |
| 1-259-802 | 1/1972 | United Kingdom . |

OTHER PUBLICATIONS

Research for New Vibration Isolation Techniques: From Hydro Mounts to Active Mounts, Andre' Gennesseaux, 931324, pp 491–499.

An Actively Damped Passenger Car Suspension System with Low Voltage Electro–Rheological Magnetic Fluid, Pinkos, Shtarkman and Fitzgerald, 930268, pp. 87–93.

New Z–direction anisotropically conductive composites, Jin, Sherwood, Mottine, Tiefel and Opila, pp. 6008–6010.

Optically Transparent, Electrically Conductive Composite Medium, Jin, Tiefel, Wolfe, Sherwood & Mottine, Jr., pp. 446–448.

Japan Patent Laid–Open Publication Bulletin A, Tokkai Hei4–266970, pp. 1–9.

A Model of the Behavior of Magnetorheological Materials—Mark R. Jolly, David Carlson and Beth C. Munoz, Jul. 19, 1996, pp. 607–614.

*Primary Examiner*—Walter E. Snow
*Attorney, Agent, or Firm*—Gregory P. Brown

[57] ABSTRACT

A method and apparatus for measuring displacement and force transferred through an elastomeric member, such as a suspension bushing (17) as used in a suspension of a motor vehicle, comprises an inner cylinder (26) fixedly connected to a suspension member (23), and an outer cylinder (28) fixedly connected to a chassis member (29). A magnetorheological elastomer (32), having particles embedded therein, is interposed between the inner (26) and outer (28) cylinders, and an electrode (44) is disposed about the inner cylinder (26). When the electrode (44) is energized by electrical current provided from module (18), a preselected electrical state resulting from the dielectric properties of the magnetorheological elastomer (32) varies in a predetermined manner in response to changes in displacement of the elastomeric material (32).

19 Claims, 3 Drawing Sheets

METHOD AND APPARATUS FOR MEASURING DISPLACEMENT AND FORCE

BACKGROUND OF THE INVENTION

1. Field of the Invention

This application is related to U.S. Ser. No. 08/585,026 entitled "Variable Stiffness Bushing Using Magnetorheological Elastomers" filed Jan. 11, 1996, now abandoned, and incorporated herein by reference, U.S. Ser. No. 08/585,069 entitled "Method and Apparatus for Varying the Stiffness of a Suspension Bushing" filed Jan. 11, 1996, now U.S. Pat. No. 5,609,353, and U.S. Ser. No. 08/681,424 entitled "Method and Apparatus for Reducing Brake Shudder" filed Jul. 23, 1996, now allowed. This invention relates to a method and apparatus for measuring displacement and force. More particularly, the method and apparatus are directed to using magnetorheological elastomers sensing or measuring relative displacement and force, especially in automotive bushings and isolation mounts.

2. Disclosure Information

It is well known in the automotive suspension art to utilize height sensors for determining the motion of a suspension system during operation to provide input for controlling various suspension and other vehicle systems. These height sensing transducers generally are packaged on suspension arms in what is otherwise a very hostile environment for such sensors. They are subject to road debris, including stones and salt solutions. Additionally, due to the movement of the components they are attached to, there must be provided sufficient clearance, or "package space", relative to other components. For example, providing space for such a sensor can result in requiring a smaller capacity fuel tank, resulting in potential customer dissatisfaction with the driving range of the vehicle. Transducers adapted for acquiring load data have similar shortcomings for production use as well as additional shortcomings in the testing environment.

In testing, it is often desirable to measure the loads being communicated through the various suspension joints and body to frame isolation mounts. Previous attempts to apply conventional strain gages to the elastomeric members used therein have met with unrepeatable and unreliable results.

It would be desirable to provide a method and apparatus for measuring displacement and forces transferred through elastomeric members located at suspension joints, body to frame isolation mounts and other connections using similar elastomeric connections.

SUMMARY OF THE INVENTION

A method and apparatus for measuring displacement and force applied to an elastomeric body having a magnetorheological elastomer disposed therein has been discovered. According to the present invention, a transducer apparatus for measuring relative displacement and force is provided. In particular, the transducer apparatus comprises a first structural member, a second structural member and a magnetorheological elastomer interposed between and connected to the first and second structural members. A module is provided for acquiring measurement data by applying a drive signal to an electrode disposed within the magnetorheological elastomer and monitoring a preselected electrical state of the magnetorheological elastomer. The module generates an output signal corresponding to variations the preselected electrical state caused by deflections of the magnetorheological elastomer.

The present invention also provides a novel method of making a transducer apparatus for measuring relative displacement. In particular, the novel method comprises the steps of: providing a first structural member for connection to a first load bearing member; providing a second structural member for connection to a second load bearing member; interposing an uncured magnetorheological elastomer having magnetic particles embedded between the first and second structural members; applying a magnetic field of a predetermined orientation relative to the first and second structural members to the magnetorheological elastomer so as to permanently align the particles in the predetermined orientation; and curing the uncured magnetorheological elastomer at a predetermined temperature level and for a predetermined period of time; whereby the predetermined orientation of the particles are electrically responsive to loads applied to the first and second structural members when the magnetorheological elastomer is electrically excited.

Additionally, the present invention provides a novel method of using a transducer apparatus for measuring relative displacement. In particular, the novel method comprises the steps of: providing a transducer having a first structural member for connection to a first load bearing member, a second structural member for connection to a second load bearing member and a magnetorheological elastomer and operatively disposed between the first and second structural members; applying a drive signal to an electrode disposed within the magnetorheological elastomer; monitoring a preselected electrical state of the magnetorheological elastomer; and generating an output signal corresponding to variations in the preselected electrical state relating to loads applied to the first and second structural members.

It is an advantage of the present invention to provide a novel transducer apparatus and a method of making and using the transducer apparatus that allows the elimination of force and/or height sensors currently used in vehicle systems. The present invention increases the usefulness of conventional elastomeric members by providing within them additional materials so that they may serve as transducers in addition to serving as isolators and pivotable joints, etc. This combination of functionality reduces part and assembly complexity as well as improving overall package efficiency for the assembled product.

DETAILED DESCRIPTION OF THE PREFERRED EMBODIMENT

Figure 1:
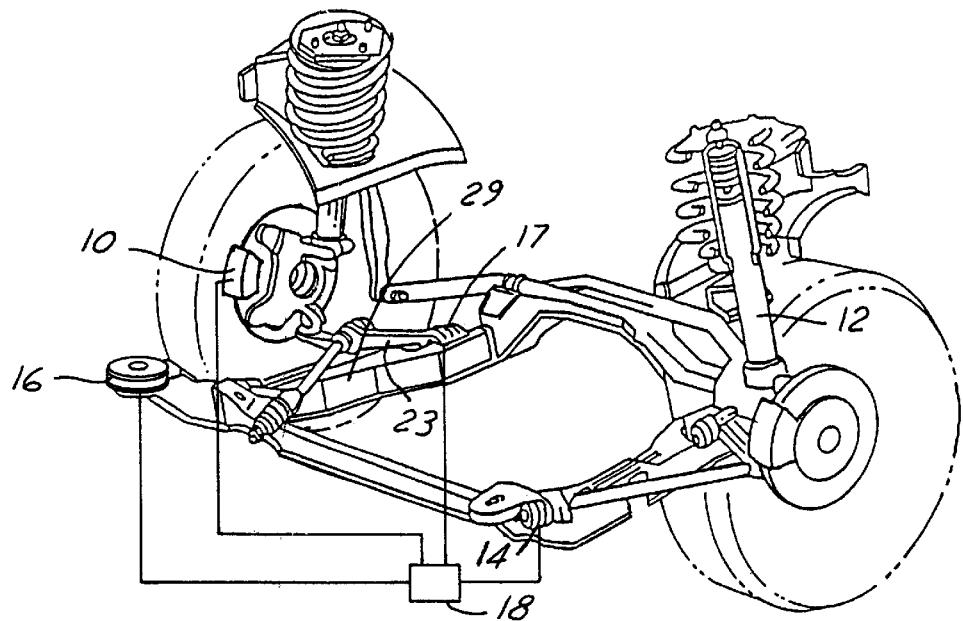
FIG. 1 is a perspective drawing of a front suspension for a motor vehicle including a transducer for measuring displacement and force according to the present invention.

As shown in FIG. 1, a method and apparatus according to the present invention is intended for use in a motor vehicle having controllable devices for which height and force data may be useful for controlling such devices. These devices may include brakes 10, adjustable struts or shocks 12, variable bushings 14, variable subframe isolators 16 and other systems not shown, such as variable assist power steering and active suspension components that have been or may be advantageous to control via controller 18.

Figure 2:
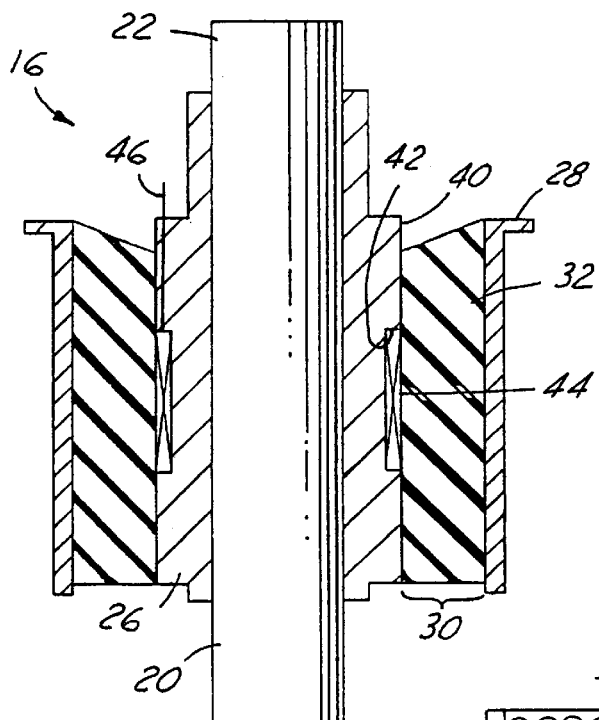
FIG. 2 is a schematic, cross-sectional view of a magnetorheological (MR) elastomer suspension bushing constructed in accordance with the principles of the invention.

Referring now to FIGS. 1 and 2, the present invention will be described as constructed in the form of a variable suspension bushing 17, however, it should be noted that the present invention could be constructed in the form of substantially any elastomeric member or joint. For instance, in a motor vehicle, the present invention could be constructed as subframe to body isolator, an upper strut mount, etc. In the presently preferred embodiment, the suspension bushing 17 incorporates a magnetorheological (MR) elastomer, which is schematically illustrated and will be described in greater detail. The suspension bushing 17 includes a central shaft or rod component 20 which may comprise a shaft or threaded fastener, such as a bolt which is fixedly connected to a suspension member 23. A first, radially inner, annular cylinder 26, which may be fabricated from a suitable low-carbon steel, is disposed about the shaft or bolt 22 and is fixedly attached thereto by suitable fastening means (not shown).

A second, radially outer, annular cylinder 28, which may also be fabricated from a suitable low-carbon steel, is disposed about the first, radially inner cylinder 26 such that an annular space 30 is defined therebetween. The second, radially outer cylinder 28 is adapted to be connected to the chassis member 29. The annular space 30 is filled with a magnetorheological (MR) elastomer 32 fabricated so as to achieve the desired operating characteristics of the variable suspension bushing 17. It should be readily apparent that the suspension bushing described herein is merely an example of a suspension bushing that has been adapted to the present invention.

Figure 3:
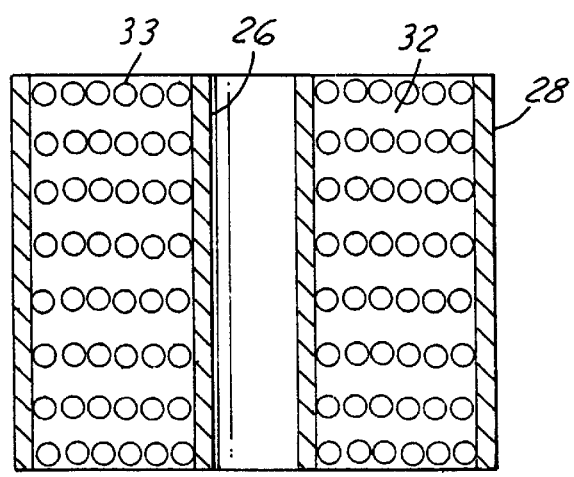
FIG. 3 is a schematic, cross-sectional view of a magnetorheological (MR) elastomer suspension bushing constructed in accordance with the principles of the invention.

Referring now to FIG. 3, the magnetorheological (MR) elastomer 32 of the present invention may comprise a suitable elastomer of natural rubber, silicone, polybutadiene, polyethylene, polyisoprene, polyurethane, or the like. The elastomer has particulate materials 33 embedded therein, which generally exhibit dielectric properties. For elastomeric bodies providing both sensing and controllably variable physical properties, there is a preference for particulates that are magnetizable by application of a magnetic field. These include particulates having paramagnetic, ferrimagnetic, or ferromagnetic properties. Examples of preferred paramagnetic particulates include compounds comprising oxides, chlorides, sulfates, sulfides, hydrates, and other organic or inorganic compounds of cerium, chromium, cobalt, dysprosium, erbium, europium, gadolinium, holmium, iron, manganese, neodymium, nickel, praesodymium, samarium, terbium, titanium, uranium, vanadium, and yttrium. Preferred paramagnetic elements and alloys include gadolinium, various stainless steels, and other alloys of iron, nickel, manganese, and cobalt, with or without other nonmagnetic elements. Preferred ferrimagnetic particulates include magnetite ($Fe_3O_4$) and other compounds of iron and oxygen, and a third metallic component. Preferred ferromagnetic materials include iron, nickel, and cobalt, as well as alloys of these and other materials.

The size of the particles 33 embedded within the elastomer 32 can vary widely, such as, for example, from 10 nanometers to several millimeters. The embedding host material for the particulates can be any substantially non-magnetic viscoelastic solid material, examples of which have been set forth hereinbefore, and the preferred materials would include those comprising either a liquid or a solid precursor that can be substantially uniformly mixed with the particles, and subsequently processed into its final solid form through means of various thermal, chemical, optical, electrical, or other treatments or processes. More specifically, a solid precursor comprising an uncured natural rubber mixture is preferred as the embedding host material due to the advantageous operative and processing characteristics of natural rubber, such as, for example, its handling capabilities, temperature resistance properties, and durability.

Referring back now to FIG. 2, the outer peripheral surface 40 of the first, radially inner, annular cylinder 26 is provided with an annular recess 42 within which an annular electromagnetic wire coil 44 is disposed to serve the dual purpose of generating a magnetic field for variable, but also serves as an electrode for purposes of measuring displacement and force across bushing 17. In particular, the coil 44 comprises three hundred ten (310) turns of a twenty two (22) gauge copper wire having high temperature polymeric insulation. Wire leads 46 extend from the coil 44 to a suitable source of electrical power, such as a vehicle battery, not shown. In this configuration, the second, radially outer, annular cylinder 28 is electrically grounded, thus serving as the second electrode for the purposes of determining the displacement and force across the elastomer 32 from the changes in capacitance and/or conductance therein.

While not necessary, it is an advantage of the present invention that this coil 44 may be utilized both in connection with the actual initial fabrication or construction of the suspension bushing 17 in its finalized form or state, as well as for supplemental energization of the finalized suspension bushing 17 during actual operative use of the automotive vehicle. If such energization for varying the physical properties of the bushing 17 is not desired, the field generated by coil 44 is only required for alignment of the particulate, and a variety of geometrically arranged electrodes may be embedded in the elastomer 32 and or positioned about the structural members 26, 28.

More particularly, the initial fabrication of the suspension bushing 17 involves coating the metal to rubber interfaces with a bonding agent to enhance adhesion therebetween. A suitable magnetorheological elastomer is then deposited within the annular space 30 defined between the first, radially inner cylinder 26 and the second, radially outer cylinder 28. The elastomer 32 is then cured at a temperature of approximately 150° C., and for a time period of between ten (10) and thirty (30) minutes, during which time a current of approximately three (3) amps is supplied to the coil 44 in order to generate a requisite magnetic field to align the particulates. Once again, if variable control of the physical properties of bushing 17 is not desired, any magnetic field generating device, such as a permanent magnet, may be disposed within annular cylinder 26, or located external to the bushing assembly to impose the desired field on the particulates. Alternatively, the particulate may be aligned and the magnetorheological elastomer cured in bulk quantities, or as distinct elements, such as cylinders, blocks, sheets, etc.) to be installed subsequently in a final configuration.

Referring again to FIG. 3, in the preferred embodiment, the magnetic field and lines of flux extend upwardly within the inner cylinder 26, across the top of the elastomer 32, downwardly within the outer cylinder 28, and across the bottom of the elastomer 32 so as to complete the magnetic circuit. The particulates embedded within the elastomer are therefore aligned into head-to-tail arrangements comprising chains which subsequently determine the both stiffness properties of the variable suspension bushing 18 as well as the capacitance and conductance when a predetermined electrical current is applied to an electrode disposed within the elastomer, such as the coil 44.

Figure 4:
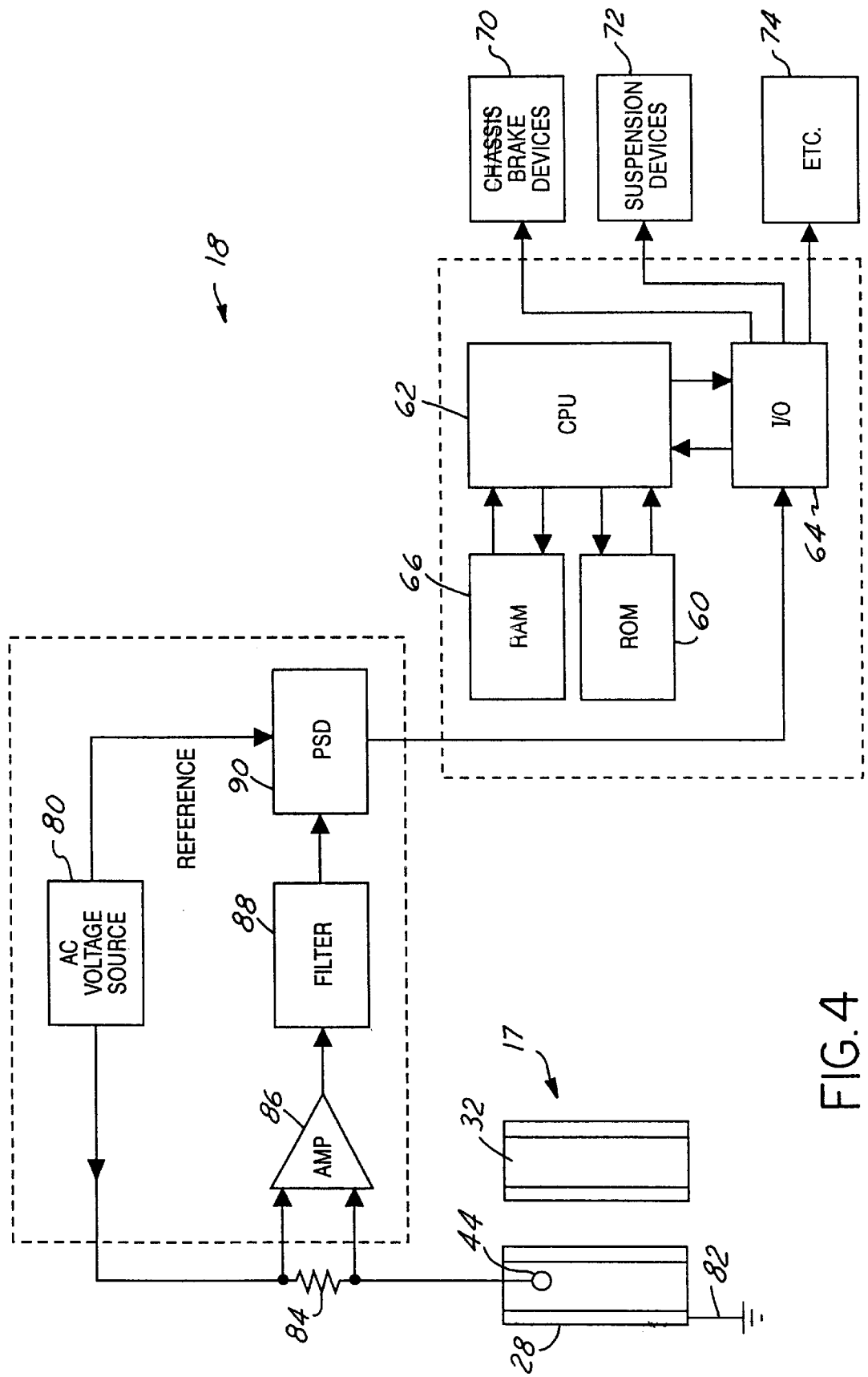
FIG. 4 is an overall system block diagram assembled in accordance with the present invention.

Referring now to FIG. 4, a module 18 for determining displacement and force data from the variable bushing 17 will now be described. The module 18 may also have the capability to provide control signals to bushing 17 as well as other controlled systems within the vehicle. Those skilled in the art will appreciate in view of this disclosure that the processor within the module 18 and its associated peripheral equipment could be structured according to several different architectures. In a preferred embodiment, however, the processor is configured so that a control program is sequentially read for each unit command from a read-only memory (ROM) 60 which stores preset control programs. Unit commands are executed by a central processing unit (CPU) 62. The processor integrally includes an input-output circuit (I/O) 64 for exchanging data with a random access memory (RAM) 66 and external devices, such as a displacement and force circuit 68, brake device, 70, variable suspension devices 72, and others controllable devices 74, and for temporarily holding data while the data are being processed.

The displacement and force circuit 68 in response to requests from the module 18 provides a signals indicating displacement or force. A drive signal, preferably in the form of alternating current is provided by an AC voltage source 80 to an electrode disposed within the elastomer 32, which in the present embodiment takes the form of the coil 44. This current then flows through the elastomer to the second annular cylinder 28 which is electrically connected to the vehicle ground 82. A high side resistor 84 may be used to provide a signal indicating the time-dependent current supplied to the input electrode 44. As the bushing 17 is subjected to loads, a preselected electrical state is measured across the electrodes, coil 44 and second cylinder 28, to determine the relative load or displacement represented thereby.

For example, the voltage across such electrodes could be monitored or the current supplied to the input electrode could be monitored. Either of these quantities would then be amplified by an amplifier 86 and then selectively filtered by filter 88. A phase-sensitive detector (PSD) 90 uses the filtered output and a reference signal generated by the voltage source 80 to determine the change in either capacitance or resistance. This change is related to the relative displacement of the particulates 33 within the elastomer 32. A lookup table or fitted analytical relationships may be used to convert the capacitance or resistance values into representative displacement values. Force or load values are determined therefrom as being nonlinearly related to the displacement of the elastomer.

Figure 5:
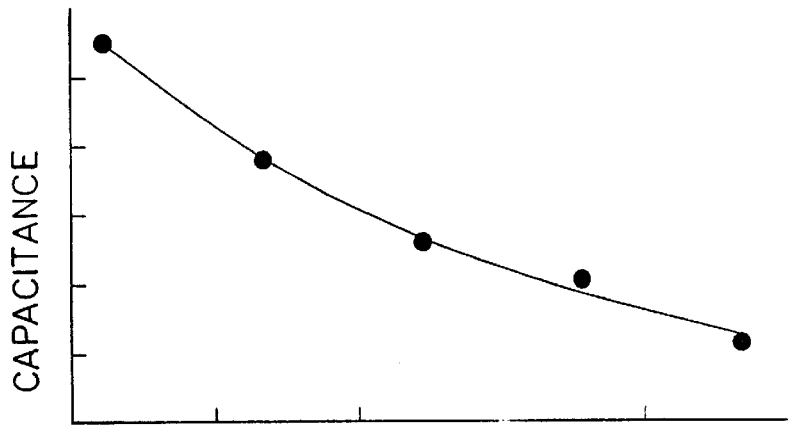
FIGS. 5 and 6 are graphical plots illustrating the variability of preselected electrical states of an magnetorheological (MR) elastomer suspension bushing under an applied axial force in accordance with the principles of the invention.
Figure 6:
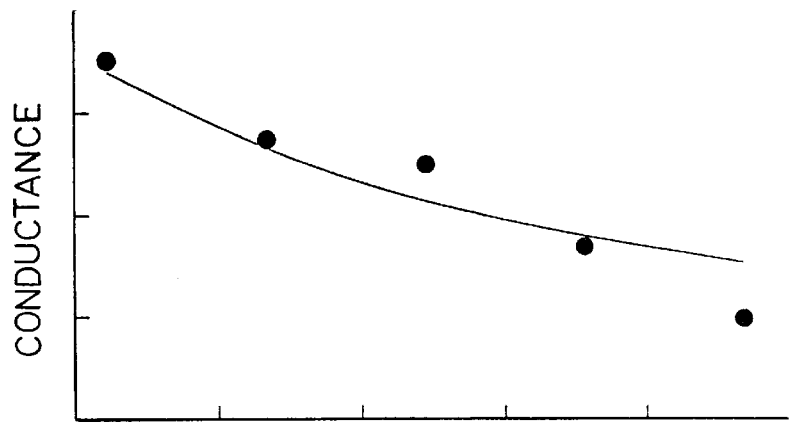
Figure 7:
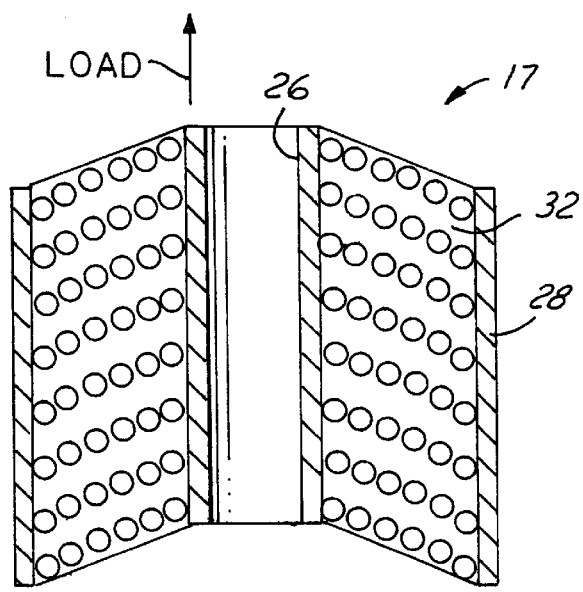
FIG. 7 is a schematic, cross-sectional view of a magnetorheological (MR) elastomer suspension bushing deformed under an axial load as applied to generate the output plotted in FIGS. 5 and 6 in accordance with the principles of the invention.

Referring now to FIGS. 5–7, the responsiveness of the preselected electrical states of a suspension bushing 17 constructed according to the principles described above in relation to a force applied to the first annular cylinder 26 of the bushing 17. The electrical properties of capacitance and conductance were measured by applying a 1 kHz sine wave between the first annular cylinder 26 (as the input electrode) and the second annular cylinder 28. The circuit monitored the in-phase (resistive) and quadrature (capacitive) components of the electrical current flowing through the elastomer. The variations of the measured capacitance and conductance versus applied axial load are displayed as solid circles.

It can be seen that both the capacitance and conductance decrease significantly with increasing applied load. This decrease corresponds to the relative displacement of the particulates suspended within the elastomer. As the elastomer deforms, the aligned chains of particulate shear, increasing the interparticle spacing, thus decreasing the capacitance and conductance through the elastomer. It was also observed that, when the described configuration was subjected to a radial load, at least some of the particles are forced closer together and the capacitance and conductance increases.

It should be noted that a particular elastomeric bushing 17 may be constructed to have, for example, the electrical characteristics illustrated within FIGS. 5–7, while other bushings may be constructed with different responses characteristics by changing the geometrical configuration, particulate alignment, electrode configuration and material parameters of the bushing.

Various modifications and variations will no doubt occur to those skilled in the art to which this invention pertains. For example, the particular sensors and signals used in conjunction with the disclosed system may be varied from those described herein. For instance, it should be apparent that many configurations with varying electrode placement as well as geometry will provide the benefit of the present invention, as well as additional benefits. These and all other variations which basically relay on the teachings by which this disclosure has advanced the art are properly considered within the scope of this invention as defined by the appended claims.

We claim:

1. A transducer apparatus for measuring relative displacement, said transducer apparatus comprising:

a first structural member;

a second structural member;

a magnetorheological elastomer interposed between and connected to said first and second structural members; and measurement means for applying a drive signal to an electrode disposed within said magnetorheological elastomer and monitoring a preselected electrical state of said magnetorheological elastomer and generating an output signal corresponding thereto in response to loads applied to said first and second structural members.

2. A transducer apparatus as set forth in claim 1, wherein said drive signal comprises an alternating current signal.

3. A transducer apparatus as set forth in claim 1, wherein at least one of said structural members is electrically grounded and said measurement means monitors a voltage signal between said electrode and said at least one of said first or second structural members.

4. A transducer apparatus as set forth in claim 1, wherein at least one of said structural members is electrically grounded and said measurement means monitors a time dependent alternating current signal supplied to said electrode and obtains said preselected electrical state using a phase-sensitive detector synchronized by a reference voltage signal.

5. A transducer apparatus as set forth in claim 1, wherein said predetermined electrical state comprises resistance.

6. A transducer apparatus as set forth in claim 1, wherein said predetermined electrical state comprises capacitance.

7. A transducer apparatus as set forth in claim 1, wherein said magnetorheological elastomer comprises a natural rubber host material within which iron particles are embedded.

8. A transducer apparatus as set forth in claim 1, wherein said first and second structural components are fabricated from low-carbon steel.

9. A method of making a transducer apparatus for measuring relative displacement comprising the steps of:

providing a first structural member for connection to a first load bearing member;

providing a second structural member for connection to a second load bearing member;

interposing an uncured magnetorheological elastomer, having iron particles embedded between said first and second structural members;

applying a magnetic field of a predetermined orientation relative to said first and second structural members to said magnetorheological elastomer so as to permanently align said particles in said predetermined orientation; and curing said uncured magnetorheological elastomer at a predetermined temperature level and for a predetermined period of time;

whereby said predetermined orientation of said particles are electrically responsive to loads applied to said first and second structural members when said magnetorheological elastomer is electrically excited.

10. A method as set forth in claim 9, further comprising the step of removing said source of said magnetic field.

11. A method as set forth in claim 9, further comprising the steps of:

providing said second structural member in the form of a second annular cylinder;

providing said first structural component in the form of a first annular cylinder which is radially spaced from and annularly surrounds said second annular cylinder;

disposing said magnetorheological elastomer within an annular space defined between said annular cylinders of said first and second structural components;

inserting a source of said magnetic field within an interior bore of said second annular cylinder; and removing said source of said magnetic field upon completion of said curing of said magnetorheological elastomer.

12. A method as set forth in claim 9, wherein: said first and second structural components are fabricated from low-carbon steel.

13. A method of measuring relative displacement comprising the steps of:

providing a transducer having a first structural member for connection to a first load bearing member, a second structural member for connection to a second load bearing member and a magnetorheological elastomer and operatively disposed between said first and second structural members;

applying a drive signal to an electrode disposed within said magnetorheological elastomer;

monitoring a preselected electrical state of said magnetorheological elastomer; and generating an output signal corresponding variations in said preselected electrical state relating to loads applied to said first and second structural members.

14. A method as set forth in claim 13, wherein: said drive signal comprises an alternating current signal.

15. A method as set forth in claim 13, further comprises the step of monitoring a voltage between said electrode and said at least one of said first or second structural members.

16. A method as set forth in claim 13, further comprises using a phase-sensitive detector synchronized by a reference voltage signal for monitoring said preselected electrical state.

17. A method as set forth in claim 13, wherein said predetermined electrical state comprises resistance.

18. A method as set forth in claim 13, wherein said predetermined electrical state comprises capacitance.

19. A method as set forth in claim 13, wherein said magnetorheological elastomer comprises a natural rubber host material within which iron particles are embedded.

\* \* \* \* \*